(12) United States Patent
Chiou et al.

(10) Patent No.: US 7,094,074 B2
(45) Date of Patent: Aug. 22, 2006

(54) MANUFACTURING METHODS FOR ULTRA-SLIM USB FLASH-MEMORY CARD WITH SUPPORTING DIVIDERS OR UNDERSIDE RIBS

(75) Inventors: Ren-Kang Chiou, Fremont, CA (US); Jim Chin-Nan Ni, San Jose, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 10/904,207

(22) Filed: Oct. 28, 2004

(65) Prior Publication Data

US 2005/0059273 A1 Mar. 17, 2005

Related U.S. Application Data

(63) Continuation-in-part of application No. 10/605,146, filed on Sep. 11, 2003, now Pat. No. 6,854,984.

(51) Int. Cl.
*H01R 12/00* (2006.01)

(52) U.S. Cl. .......................... 439/79; 439/610

(58) Field of Classification Search ........ 439/607–610, 439/79, 379, 541.5, 660, 639, 291, 680, 518, 439/638, 292, 295, 677, 76.1, 377; 235/431, 235/451, 441; 361/785, 752, 791, 756, 803, 361/727, 746, 686, 802
See application file for complete search history.

(56) References Cited

U.S. PATENT DOCUMENTS

| | | | |
|---|---|---|---|
| 5,725,395 A | 3/1998 | Lee et al. ................... 439/610 |
| 5,941,733 A | 8/1999 | Lai et al. ................... 439/610 |
| 6,027,375 A | 2/2000 | Wu et al. ................... 439/607 |
| 6,165,016 A | 12/2000 | Lai ........................... 439/610 |
| 6,315,582 B1 | 11/2001 | Nishio et al. .............. 439/131 |
| 6,334,793 B1 | 1/2002 | Amoni et al. .............. 439/680 |
| 6,385,677 B1 | 5/2002 | Yao ............................ 711/115 |
| 6,439,464 B1 | 8/2002 | Fruhauf et al. ............. 235/492 |
| 6,462,953 B1 | 10/2002 | Tong et al. ................. 361/732 |
| 6,533,612 B1 | 3/2003 | Lee et al. ................... 439/607 |
| 6,561,421 B1 | 5/2003 | Yu ............................. 235/451 |
| 6,567,273 B1 | 5/2003 | Liu et al. .................... 361/737 |
| 6,629,851 B1 | 10/2003 | Kikuchi et al. .............. 439/79 |
| 6,676,419 B1 * | 1/2004 | Lin et al. .................... 439/76.1 |
| 6,733,329 B1 * | 5/2004 | Yang .......................... 439/518 |
| 6,744,634 B1 * | 6/2004 | Yen ............................ 361/752 |
| 6,778,401 B1 * | 8/2004 | Yu et al. ..................... 361/752 |
| 6,854,984 B1 * | 2/2005 | Lee et al. ..................... 439/79 |

(Continued)

*Primary Examiner*—Truc T. Nguyen
*Assistant Examiner*—Edwin A. Leon
(74) *Attorney, Agent, or Firm*—Stuart T. Auvine

(57) ABSTRACT

A flash-memory-drive card has an integrated slim Universal-Serial-Bus (USB) connector that fits into a standard USB socket. The slim USB connector has 4 metal contacts on a board that is encapsulated by upper and lower plastic cases. Components are mounted onto the board on the side opposite the metal contacts. A thinner portion of the plastic case forms a light window that allows a light-emitting diode on the board to shine through the case. The plastic cases can be bonded together ultrasonically or with adhesive or using snaps and groves. Supporting underside ribs in the lower plastic case opposite the metal contacts allow most of the card to be thinner than the spacing in the standard USB socket. Dividers between the metal contacts are formed between openings in the upper case. The dividers help to fill gaps between the slim USB connector and the standard USB socket.

23 Claims, 13 Drawing Sheets

U.S. PATENT DOCUMENTS

| | | | |
|---|---|---|---|
| 6,877,994 B1 * | 4/2005 | Huang | 439/76.1 |
| 2003/0094490 A1 | 5/2003 | Lee | 235/441 |
| 2003/0100203 A1 | 5/2003 | Yen | 439/79 |
| 2003/0104835 A1 | 6/2003 | Douhet | 455/557 |
| 2003/0145141 A1 | 7/2003 | Chen et al. | 710/74 |
| 2004/0087213 A1 | 5/2004 | Kao | 439/638 |

* cited by examiner

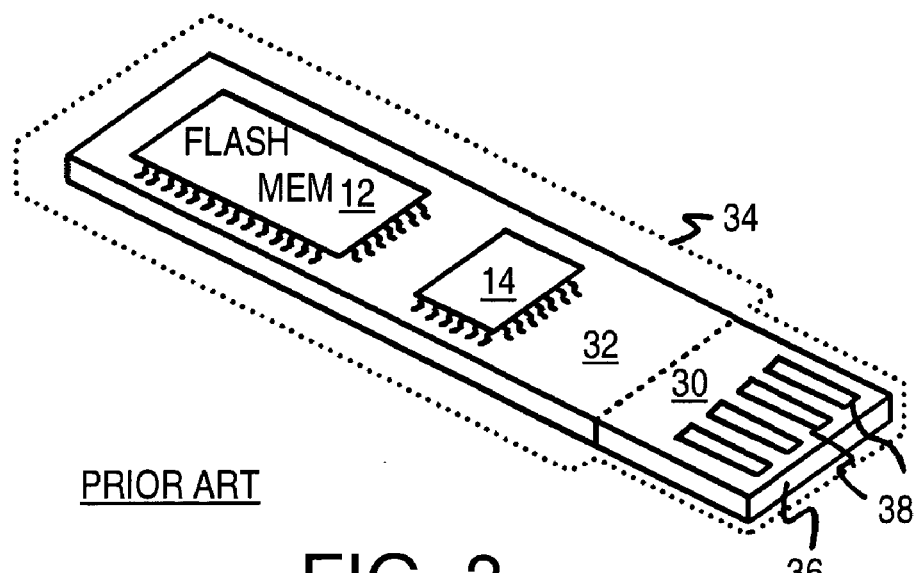
PRIOR ART
FIG. 3
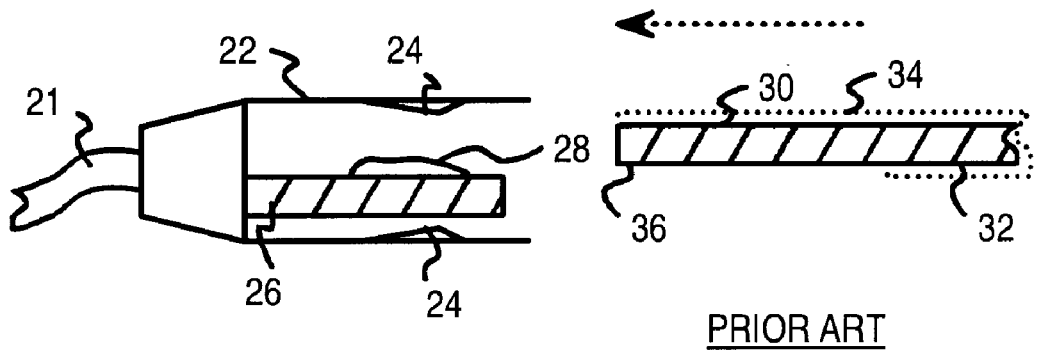
FIG. 4A    PRIOR ART
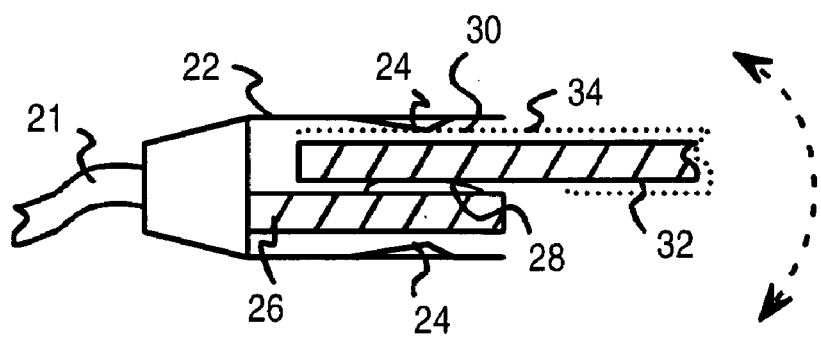
PRIOR ART    FIG. 4B

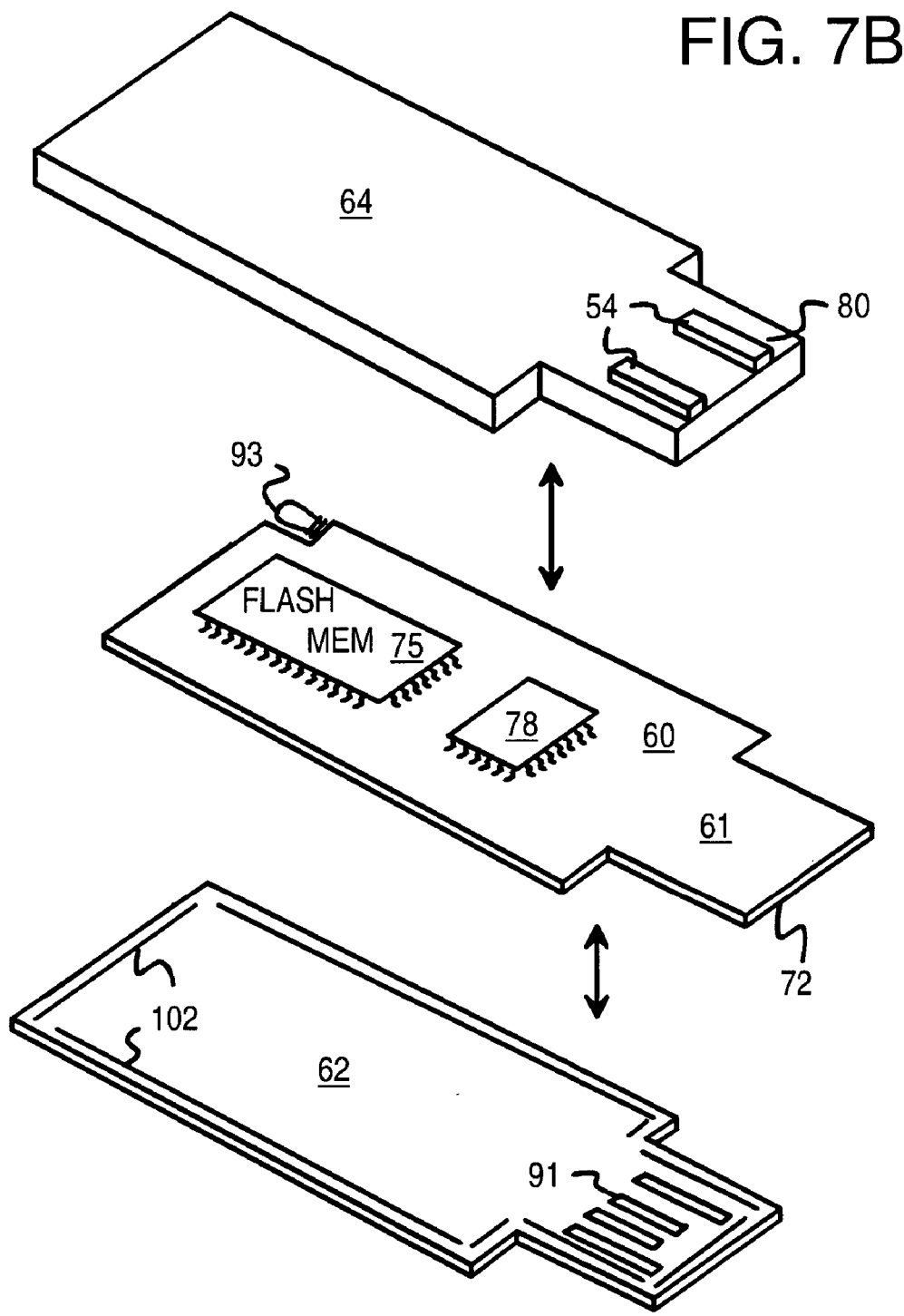

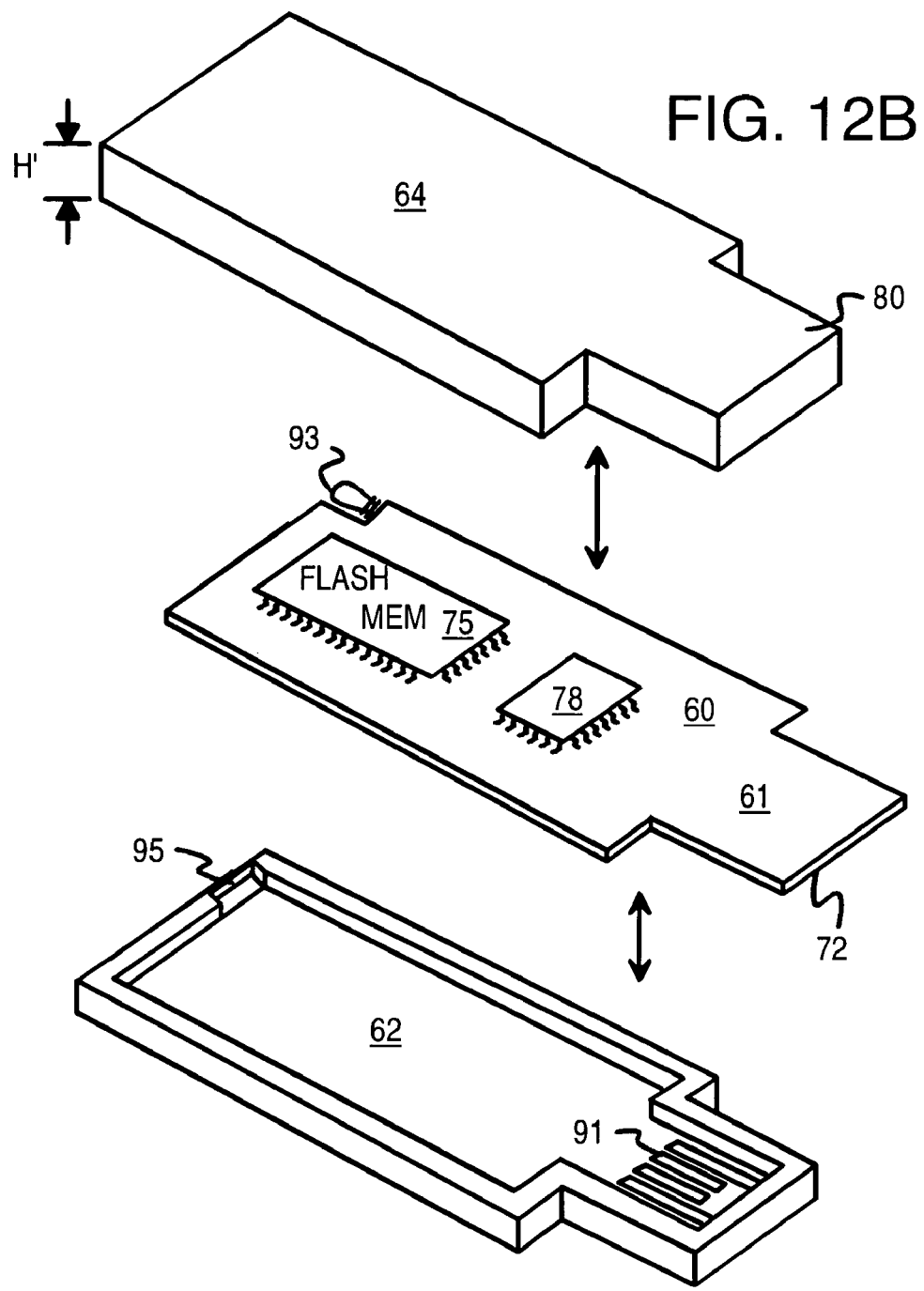

MANUFACTURING METHODS FOR ULTRA-SLIM USB FLASH-MEMORY CARD WITH SUPPORTING DIVIDERS OR UNDERSIDE RIBS

This invention relates to flash-memory-drive cards, and more particularly to cards with reduced-height Universal-Serial-Bus (USB) connectors.

BACKGROUND OF THE INVENTION

Flash-memory technologies such as those using electrically-erasable programmable read-only memory (EEPROM) have produced chips storing 1 G-Bytes or more. Small flash-memory cards have been designed that have a connector that can plug into a specialized reader, such as for compact-flash, secure-digital, memory stick, or other standardized formats.

More recently, flash memory cards are being sold that contain a USB connector. Such USB-flash memory cards do not require a specialized reader but can be plugged into a USB connector on a personal computer (PC) or other hosting device. These USB-flash memory cards can be used in place of floppy disks. A USB-flash card can have a capacity of more than ten floppy disks in an area not much larger than a large postage stamp.

FIG. 1A shows a prior-art flash-memory card with a USB connector. Flash memory chip 12 may be a 128 Mega-byte non-volatile chip or may have some other capacity. Controller chip 14 contains a flash-memory controller that generates signals to access memory locations within flash memory chip 12. Controller chip 14 also contains a USB interface controller that serially transfers data to and from flash memory chip 12 over a USB connection.

USB connector 20 may be mounted on board 10, which is a small circuit board with chips 12, 14 mounted thereon. Multi-layer printed-circuit board (PCB) technology can be used for board 10. A plastic case (not shown) can surround board 10.

USB connector 20 contains a small connector substrate 16, which is often white ceramic, black rigid plastic, or another sturdy substrate. Connector substrate 16 has four or more metal contacts 18 formed thereon. Metal contacts 18 carry the USB signals generated or received by controller chip 14. USB signals include power, ground, and serial differential data D+, D−.

USB connector 20 contains a metal case that wraps around connector substrate 16. The metal case touches connector substrate 16 on three of the sides of connector substrate 16. The top side of connector substrate 16, holding metal contacts 18, has a large gap to the top of the metal case. On the top and bottom of this metal wrap are formed holes 15. USB connector 20 is a male connector, such as a type-A USB connector.

FIG. 1B shows a female USB connector. Female USB connector 22 can be an integral part of a PC, or can be connected by cable 21. Another connector substrate 26 contains four metal contacts 28 that make electrical contact with the four metal contacts 18 of the male USB connector 20 of FIG. 1A. Connector substrate 26 is wrapped by a metal case, but small gaps are between the metal case and connector substrate 26 on the lower three sides.

Locking is provided by metal springs 24 in the top and bottom of the metal case. When male USB connector 20 of FIG. 1A is flipped over and inserted into Female USB connector 22 of FIG. 1B, metal springs 24 lock into holes 15 of male USB connector 20.

FIGS. 2A, 2B are cross-sections highlighting connections between male and female USB connectors. Female USB connector 22 is on the left while male USB connector 20 is being inserted from the right. Male USB connector 20 is flipped over relative to the view of FIG. 1A. Metal contacts 18 are formed on the lower surface of connector substrate 16 on male USB connector 20, while metal contacts 28 are formed on the upper surface of connector substrate 26 on Female USB connector 22. Thus the metal contacts face one another to allow for electrical contact when male USB connector 20 is inserted into Female USB connector 22 as shown in FIG. 2B.

Metal springs 24 formed on the metal case surrounding connector substrate 26 on Female USB connector 22 fit into holes on the metal case of male USB connector 20. This helps to lock the connectors together.

FIG. 3 shows a prior-art USB flash memory card using a slim USB connector. Male USB connector 20 of FIGS. 1, 2 is relatively large. The metal case in particular is cumbersome and increases manufacturing cost. Costs may be reduced by integrating male USB connector 30 with board 32. Board 32 is a PCB that has flash memory chip 12 and controller chip 14 mounted thereon. Board 32 is extended to include male USB connector 30, which has metal contacts 38 formed on end 36 of board 32.

The width and thickness of board 32 at end 36 containing male USB connector 30 is designed to approximately match that of connector substrate 16 of FIG. 1A. Plastic case 34 can enclose board 32 but have an opening for metal contacts 38. Plastic case 34 can cover the bottom and sides of male USB connector 30 up to end 36 to emulate potions of the metal case of the male USB connector of FIG. 1A.

FIGS. 4A, 4B show cross-sections of the prior-art slim USB connector being inserted into a standard Female USB connector. Board 32 that has male USB connector 30 formed on end 36 is flipped over from the view shown in FIG. 3, and end 36 is inserted into female USB connector 22 from the right side.

Metal contacts 38 are located on the lower surface of male USB connector 30. Plastic case 34 has an opening on the lower surface of male USB connector 30 to expose the metal contacts so they can make electrical connection with metal contacts 28 on the upper surface of connector substrate 26 of Female USB connector 22 when inserted as shown in FIG. 4B.

Plastic case 34 helps to fill the gate between board 32 and the top edge of the metal case of Female USB connector 22. Plastic case 34 is also formed along the thin edges of board 32 and helps to fill in the gaps between connector substrate 26 and the sides of the metal case of Female USB connector 22 that are above and below the plane of FIG. 4B.

While slim USB connector 30 can be less expensive and smaller than the standard USB connector, it fits less securely into a standard Female USB connector. The lack of the metal case removes the mechanical support provided as the male metal case that fit in the gap below connector substrate 26 and the bottom side of the metal case for the female connector. The result is a noticeable wobble in the up and down direction when a USB flash memory card containing male USB connector 30 is inserted into Female USB connector 22. Vertical movement of 3–4 millimeter at the end of a 4-centimeter flash card can occur with slight finger pressure. This vertical play gives the user the feeling that the flash memory card is cheap and unreliable, even when sufficient electrical contact is made.

Parent Patent Uses Dividers and End Rails to Aid Support

The parent patent, U.S. Ser. No. 10/605,146, now U.S. Pat. No. 6,854,984 disclosed using dividers between the metal USB pads and end rails to increase support for a slim USB connector. A flash-memory card using such as supporting slim USB connector was also disclosed in the parent patent.

FIGS. 5A–C show a male slim USB connector that is integrated with a circuit-board substrate of a flash memory card. The USB flash-memory card is assembled from upper case 62 of FIG. 5A, board 60 and its components of FIG. 5B, and lower case 64 of FIG. 5C, which are sandwiched together to form the card of FIG. 6.

In FIG. 5B, flash memory chip 75 and controller chip 78 are mounted on board 60, which can be a multi-layer PCB or similar substrate with wiring traces. Extension 61 of board 60 has a width that approximately matches the width of the connector substrate in a male USB connector. Metal contacts 70 are formed on extension 61 to act as the USB metal contacts of the male slim USB connector. End 72 of board 60 is inserted into the female USB connector.

In FIG. 5A, upper case 62 can be made of plastic or other material. Two end rails 66 and three dividers 68 are formed on the extension end of upper case 62. Openings 69 in upper case 62 between dividers 68 and end rails 66 allow metal contacts 70 of FIG. 5B to be exposed through upper case 62 when assembled. Dividers 68 and end rails 66 can be made from the same material as the rest of upper case 62, such as by all being part of one plastic molding. End rails 66 may be taller than dividers 68 or may be the same height as the dividers.

In FIG. 5C, lower case 64 includes extended region 80. Locking depressions 82 are in extended region 80. A single molding can form lower case 64 with locking depressions 82 in extended region 80.

Locking depressions 82 can be made in a variety of ways. For example, locking depressions 82 can be made during molding of lower case 64, or by milling, punching, or machining case 64 after molding. Depressions 82 can be holes that completely pass through case 64, or can be thinned regions that do not reach completely through case 64.

FIG. 6 shows an assembled USB flash-memory card. Upper case 62 and lower case 64 are plastic cases that fit together, enclosing board 60 of FIG. 6B. End rails 66 and dividers 68 in upper case 62 fit over extension 61 of board 60. Metal contacts 70 on board 60 are exposed through openings 69 in upper case 62 between dividers 68 and end rails 66. Locking depressions (not visible) are formed in lower case 64.

While useful, various improvements in the flash-memory card with the slim USB connector have been developed by the inventors. Manufacturing methods and products made by these methods are also being disclosed in this application.

BRIEF DESCRIPTION OF THE DRAWINGS

FIG. 3 shows a prior-art USB flash memory card using a slim USB connector.

FIGS. 4A, 4B show cross-sections of the prior-art slim USB connector being inserted into a standard Female USB connector.

FIGS. 7A–B show assembly of a flash-memory-drive card with a reduced thickness using an ultrasonic-bond process.

FIGS. 12A–B show assembly of a flash-memory-drive card with a reduced thickness using a thermal-bond adhesive process.

DETAILED DESCRIPTION

The present invention relates to an improvement in flash-memory cards with slim USB connectors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have discovered that a variety of manufacturing methods may be used to make the flash-memory card with supporting dividers between the USB metal pads. Manufacturing methods include ultrasonic press, snap-together with snap tabs, and adhesive bonding together of the upper and lower plastic cases.

The inventors have also discovered that the IC chips and other components may be mounted on the side of the board that is opposite to the 4 USB metal pads. This can allow for a thinner flash-memory drive card. The side with the 4 USB pads can be flatter when no IC chips are mounted on this side, allowing for a flatter USB drive package. Having IC chips on the same side would require that the USB drive package protrude upward to cover the IC chips.

In addition, a portion of the plastic case may have a reduced thickness. A light-emitting diode (LED) or light pipe may be placed near this reduced-thickness area of the plastic case, allowing the user to see an indicator light mounted to the circuit board. The indicator light can turn on or blink when the memory is being accessed or written, and various patterns or sequences could be used to indicate the different operations (constant on for reading, rapid blinks for writing, long blinks for errors, etc.)

Rather than use locking depressions to engage the metal springs in the USB socket, supporting ribs or bumps can be formed on the bottom plastic case. The supporting ribs can slide over the metal springs, allowing the rest of the plastic case to have a reduced thickness while still providing support of the flash-memory card within the USB socket.

Figure 7A:
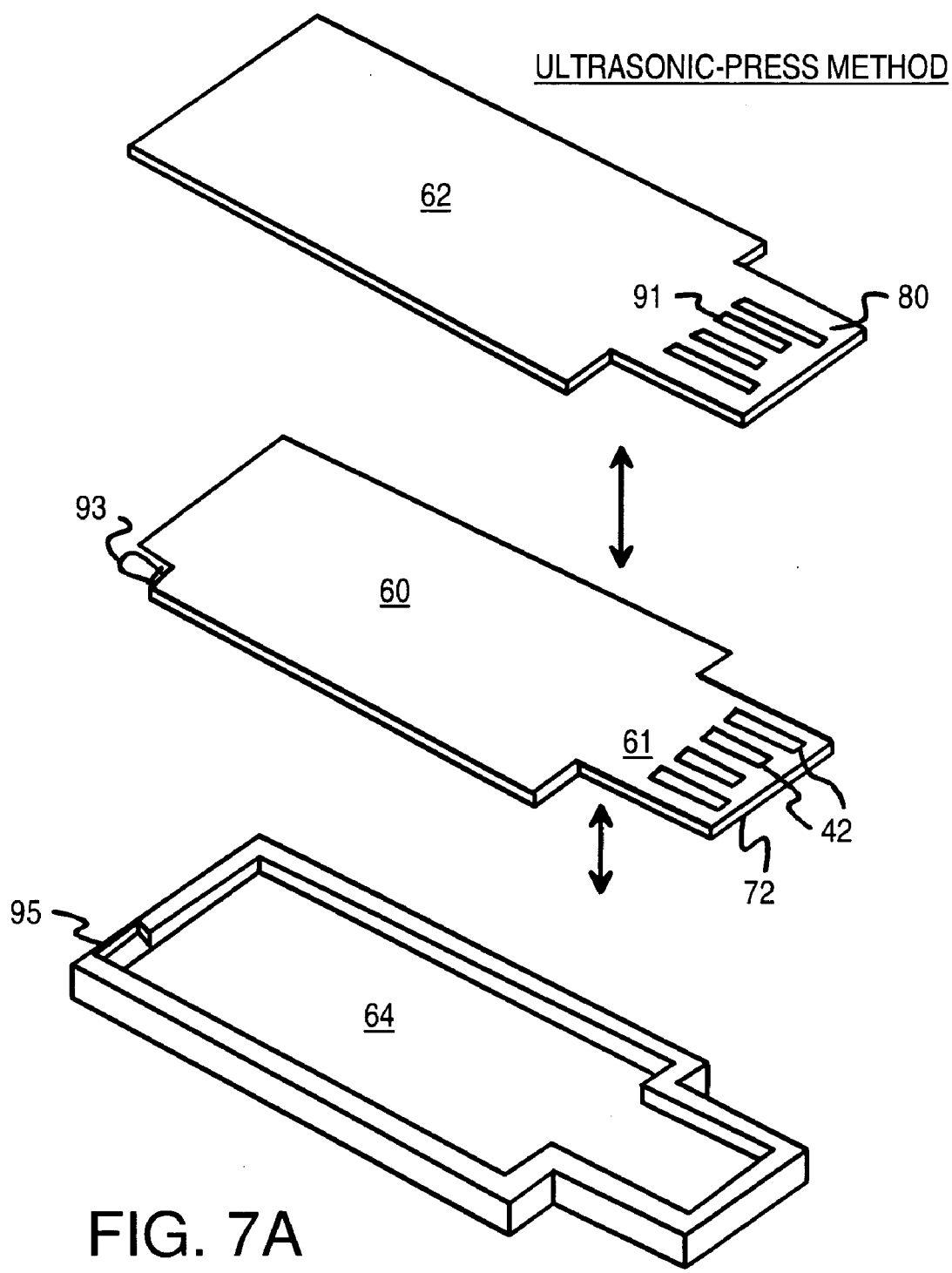

FIGS. 7A–B show assembly of a flash-memory-drive card with a reduced thickness using an ultrasonic-bond process. The top or upper side may be considered to be the side having the 4 USB metal pads facing upward, while the bottom side is the side without the USB metal pads.

Figure 9:
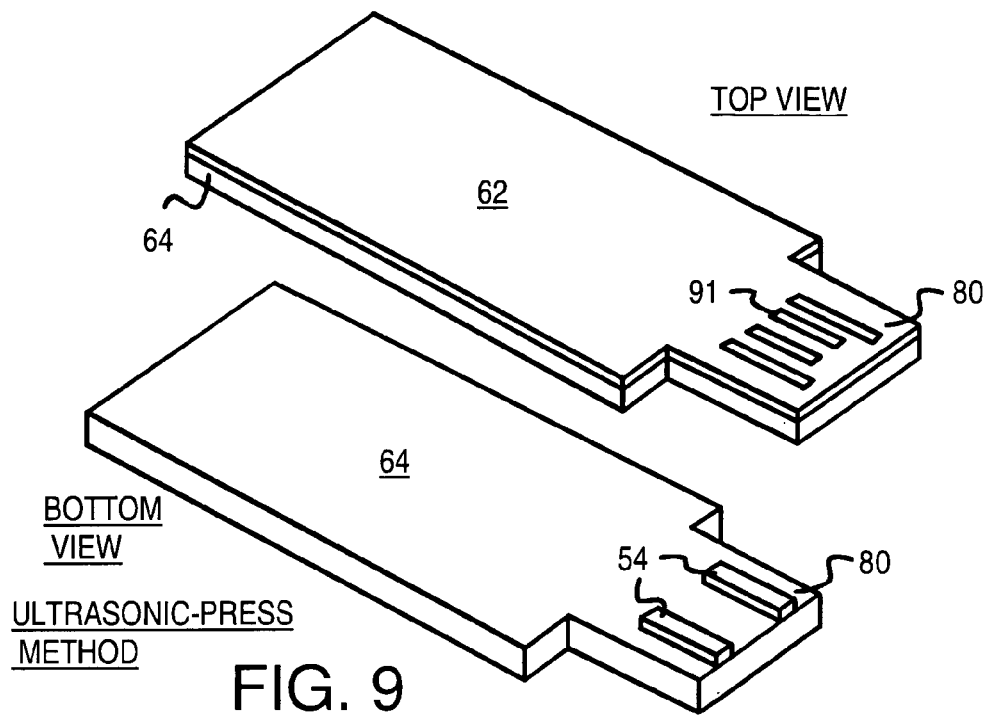
FIG. 9 shows a USB flash-memory card assembled using the ultrasonic-bonding method.

The USB flash-memory card is assembled from upper case 62, board 60 and its mounted components, and lower case 64, which are sandwiched together to form the USB-drive of FIG. 9. FIG. 7A shows a top view, where metal contacts 42 are visible, while FIG. 7B shows a bottom view where metal contacts 42 are hidden from view.

Figure 1A:
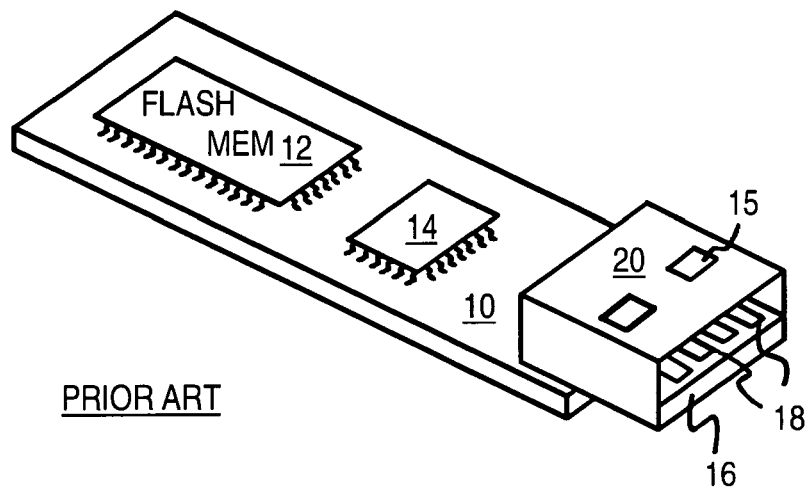
FIG. 1A shows a prior-art flash-memory card with a USB connector.
Figure 1B:
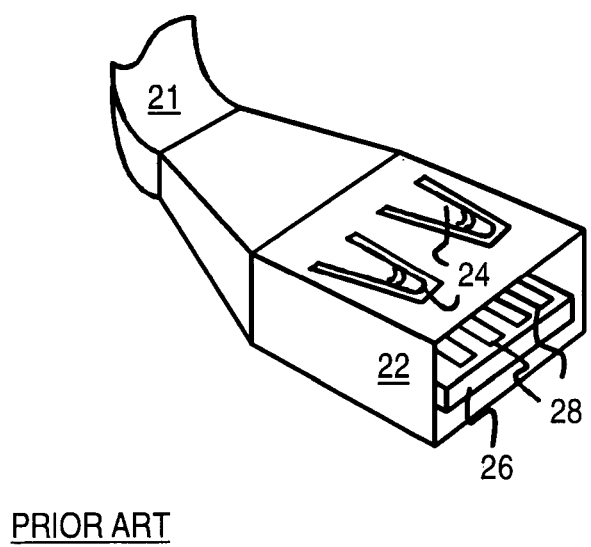
FIG. 1B shows a female USB connector.
Figure 2A:
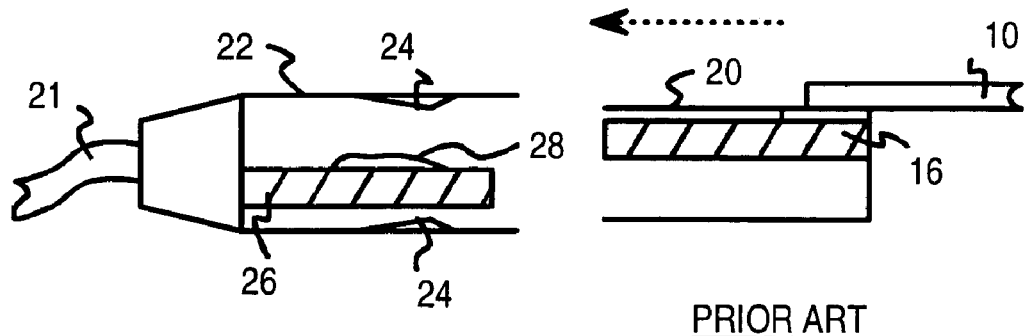
FIGS. 2A, 2B are cross-sections highlighting connections between male and female USB connectors.
Figure 2B:
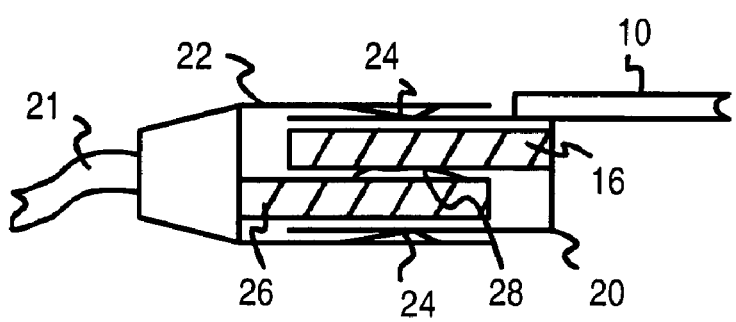
Figure 5A:
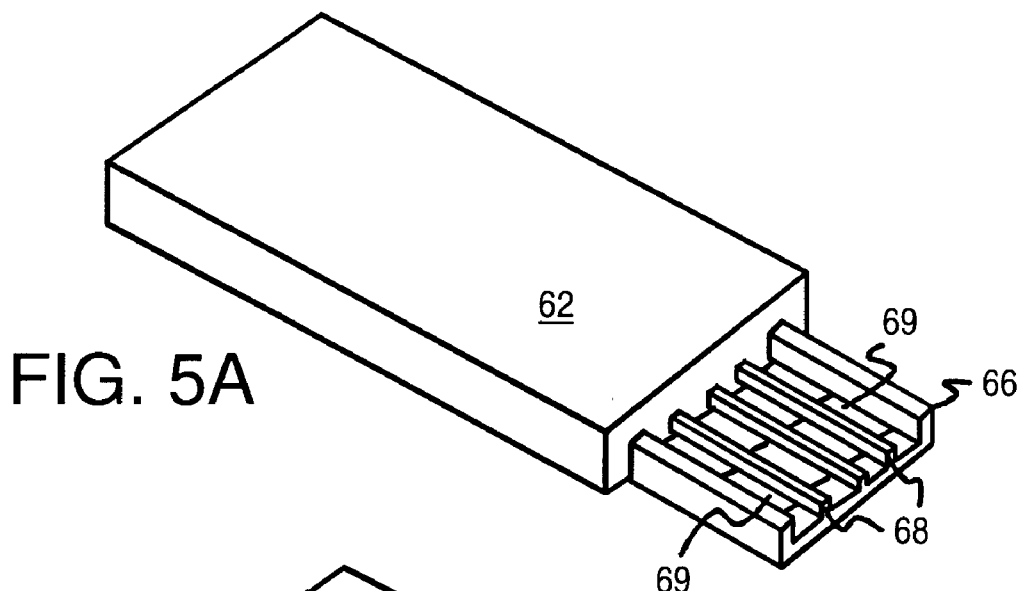
FIGS. 5A–C show a male slim USB connector that is integrated with a circuit-board substrate of a flash memory card.
Figure 5B:
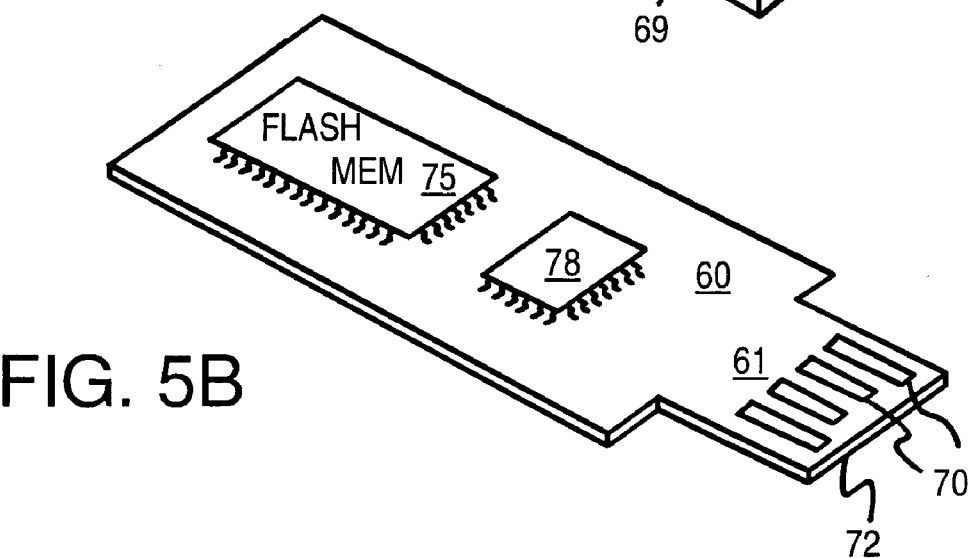
Figure 5C:
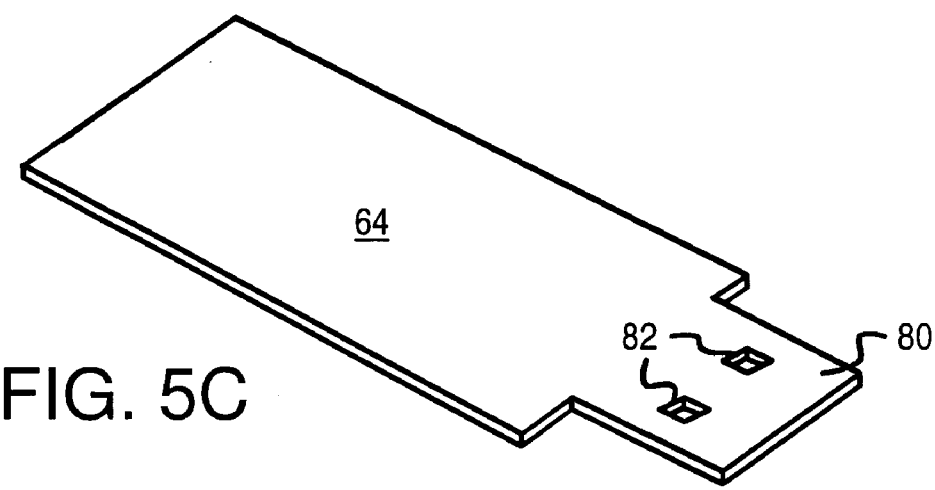
Figure 6:
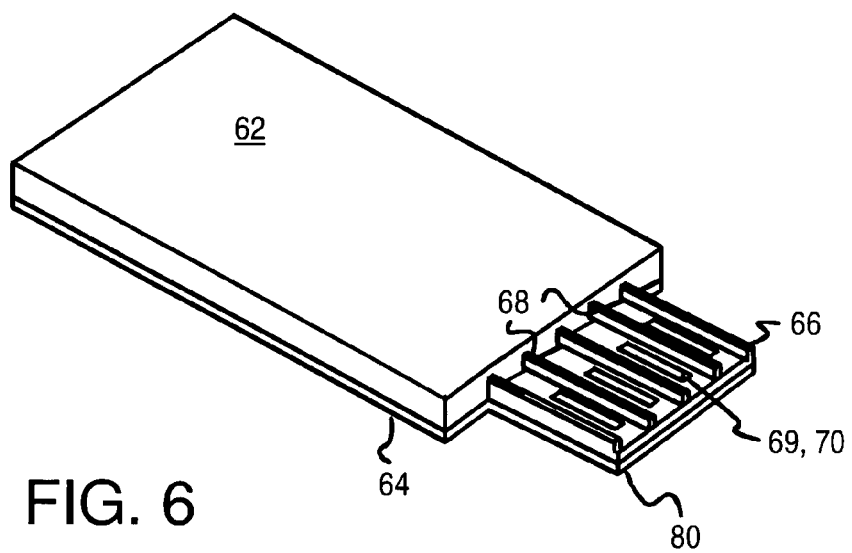
FIG. 6 shows an assembled USB flash-memory card.

In FIG. 7B, flash memory chip 75 and controller chip 78 are mounted on the reverse (bottom) side of board 60, which can be a multi-layer PCB or similar substrate with wiring traces. FIG. 7A shows that the 4 USB contacts, metal contacts 42, are formed on the top side of board 60. Since most components are mounted on the bottom side of board 60 opposite the top side with metal contacts 42, board 60 may be mounted flush with the inside surface of lower case upper case 62, removing ore reducing and air gap between board 60 and upper case 62. This allows upper case 62 to have a lower profile or even a co-planar top surface that can be seen by comparing FIG. 9 to FIG. 6.

Extension 61 of board 60 has a width that approximately matches the width of the connector substrate in a male USB connector. Metal contacts 42 are formed on extension 61 to act as the USB metal contacts of the male slim USB connector. End 72 of board 60 is inserted into the female USB connector.

Upper case 62 can be made of plastic or other material. Three dividers are formed on extended region 80 of upper case 62 between four openings 91. Openings 91 in upper case 62 allow metal contacts 42 of board 60 to be exposed through upper case 62 when assembled. The dividers and end rails on upper case 62 are integral with upper case 62 and formed from the same material as the rest of upper case 62, such as by all being part of one plastic molding. The end rails may be taller than the dividers or may be the same height as the dividers.

Lower case 64 also includes extended region 80. Supporting underside ribs 54 are formed in extended region 80. Supporting underside ribs 54 allow lower case 64 to have a smaller thickness since supporting underside ribs 54 provide additional thickness to meet the metal springs in the USB socket. A single molding can form lower case 64 with supporting underside ribs 54 in extended region 80.

LED 93 can be mounted on board 60, such as on the bottom side with other components, or extending from an edge of board 60. A region of reduced thickness is formed in lower case 64 to create light window 95. Light window 95 could be formed on the back wall of lower case 64 as shown, or could be formed on the larger bottom surface of lower case 64 or on some other area of lower case 64. Light from LED 93 can partially pass through the thinner plastic of light window 95, allowing the user to see a visible indicator of activity. A light guide or pipe could also be used to channel the light path to light window 95.

Raised ridges 102 are formed on the lower surface of upper case 62, as shown in FIG. 7B. During assembly, ridges 102 first contact lower case 64 when upper case 62 and lower case 64 are fitted together with board 60 in-between or already mounted inside lower case 64. When ultrasonic vibrations are applied to one of upper case 62 or lower case 64, ridges 102 are rubbed against lower case 64 at a high frequency, causing frictional heating. The heating of ridges 102 causes them to be welded to lower case 64, resulting in a permanent bond that encapsulates board 60 between upper case 62 and lower case 64. A variety of shapes can be used for ridges 102, such as bumps, lines, bars, etc.

Figure 8A:
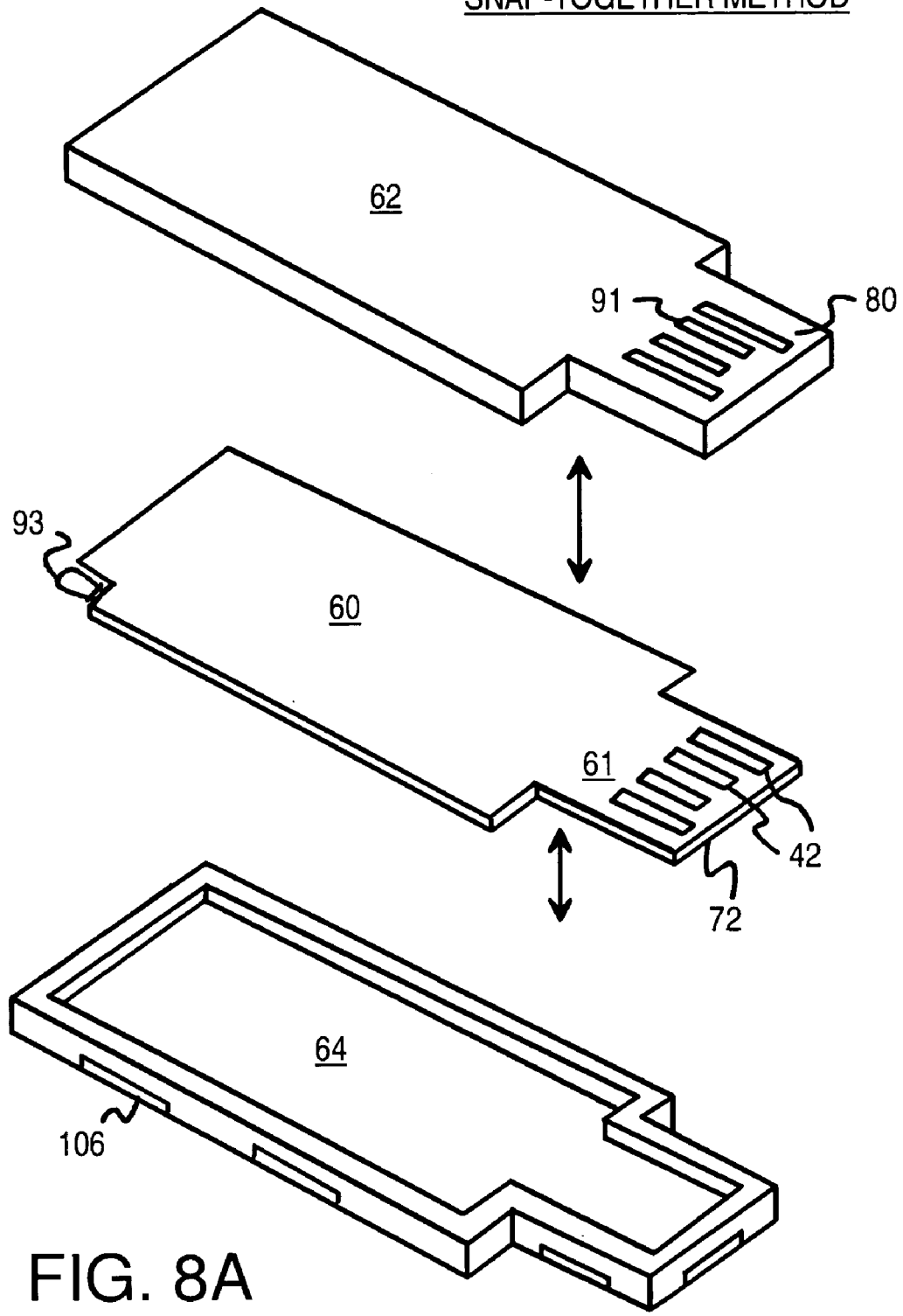
FIGS. 8A–B show assembly of a flash-memory-drive card with a reduced thickness using a snap-together process.
Figure 8B:
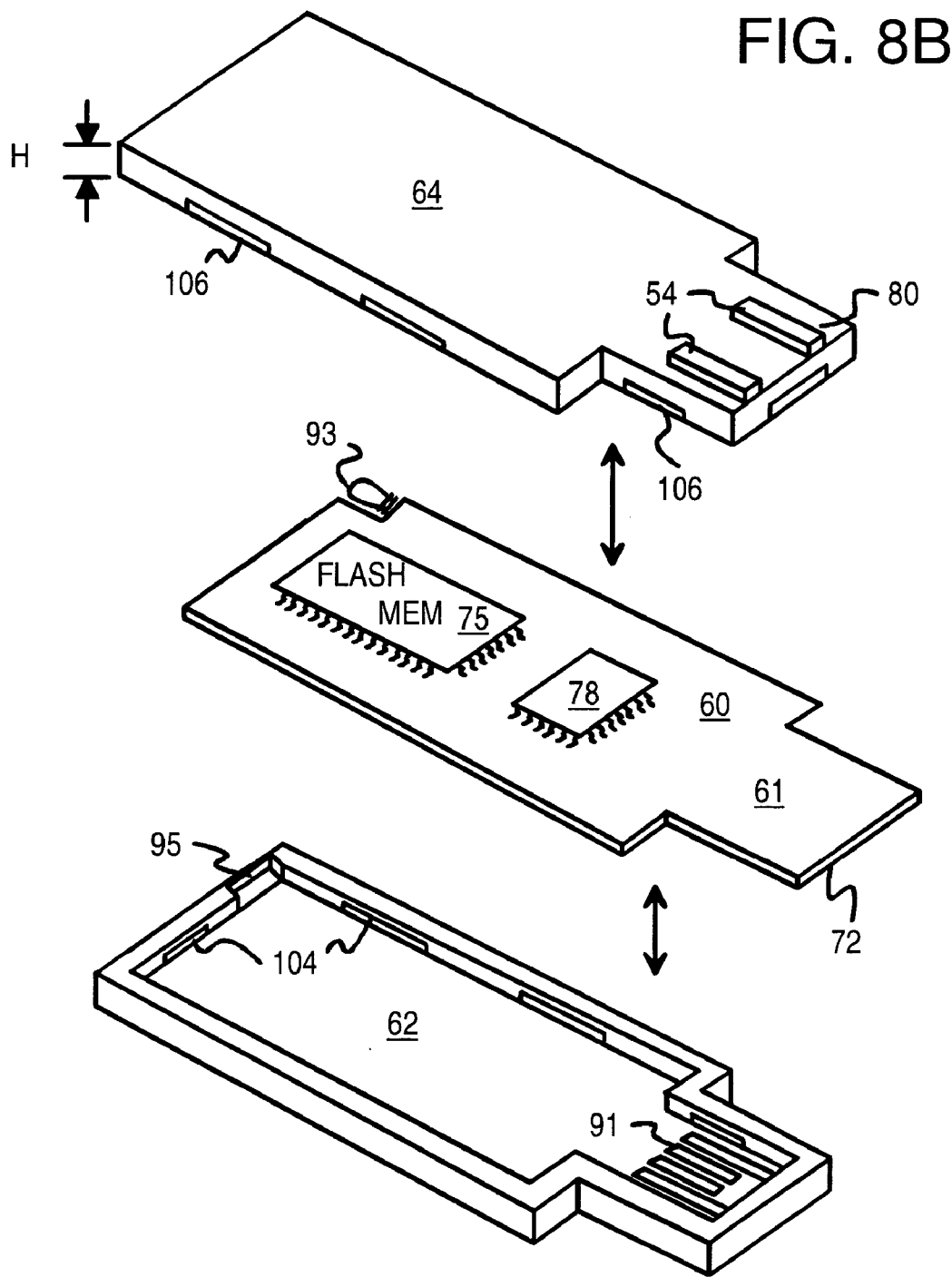

FIGS. 8A–B show assembly of a flash-memory-drive card with a reduced thickness using a snap-together process. The USB flash-memory card is assembled from upper case 62, board 60 and its mounted components, and lower case 64, which are sandwiched together to form the USB-drive of FIG. 10. FIG. 8A shows a top view, where metal contacts 42 are visible, while FIG. 8B shows a bottom view where metal contacts 42 are hidden from view.

Snap tabs 106 are semi-flexible plastic extensions or protrusion tabs formed on the outer edges of lower case 64 and extend outward. Grooves 104 are formed on the inner peripheral edge of upper case 62 and match positions of snap tabs 106. The peripheral outline of upper case 62 is somewhat smaller than for lower case 64 so that lower case 64 can fit inside upper case 62. During assembly, when lower case 64 is forced inside upper case 62, snap tabs 106 are forced into grooves 104 and snap into place inside grooves 104 when lower case 64 is fully inserted into upper case 62. This locks lower case 64 into upper case 62. A variety of shapes can be used for snap tabs 106 and grooves 104.

In FIG. 8B, flash memory chip 75 and controller chip 78 are mounted on the reverse (bottom) side of board 60, which can be a multi-layer PCB or similar substrate with wiring traces. FIG. 8A shows that the 4 USB contacts, metal contacts 42, are formed on the top side of board 60. Since most components are mounted on the bottom side of board 60 opposite the top side with metal contacts 42, board 60 may be mounted flush with the inside surface of lower case upper case 62, removing ore reducing and air gap between board 60 and upper case 62. This allows upper case 62 to have a lower profile or even a co-planar top surface that can be seen by comparing FIG. 9 to FIG. 6.

Extension 61 of board 60 has a width that approximately matches the width of the connector substrate in a male USB connector. Metal contacts 42 are formed on extension 61 to act as the USB metal contacts of the male slim USB connector. End 72 of board 60 is inserted into the female USB connector.

Upper case 62 can be made of plastic or other material. Three dividers are formed on extended region 80 of upper case 62 between four openings 91. Openings 91 in upper case 62 allow metal contacts 42 of board 60 to be exposed through upper case 62 when assembled. The dividers and end rails on upper case 62 are integral with upper case 62 and formed from the same material as the rest of upper case 62, such as by all being part of one plastic molding. The end rails may be taller than the dividers or may be the same height as the dividers.

Lower case 64 also includes extended region 80. Supporting underside ribs 54 are formed in extended region 80. Supporting underside ribs 54 allow lower case 64 to have a smaller thickness since supporting underside ribs 54 provide additional thickness to meet the metal springs in the USB socket. A single molding can form lower case 64 with supporting underside ribs 54 in extended region 80.

LED 93 can be mounted on board 60, such as on the bottom side with other components, or extending from an edge of board 60. A region of reduced thickness is formed in lower case 64 to create light window 95. Light window 95 could be formed on the back wall of lower case 64 as shown, or could be formed on the larger bottom surface of lower case 64 or on some other area of lower case 64. Light from LED 93 can partially pass through the thinner plastic of light window 95, allowing the user to see a visible indicator of activity. A light guide or pipe could also be used to channel the light path to light window 95.

FIG. 9 shows a USB flash-memory card assembled using the ultrasonic-bonding method. Upper case 62 and lower case 64 are plastic cases that fit together and are bonded together by ultrasonic heating, enclosing board 60 of FIGS. 7A–B. Metal contacts 42 on board 60 are exposed through openings 91 in upper case 62 between dividers and end rails. Supporting underside ribs 54 are formed in lower case 64, allowing the total thickness of the assembled flash-memory card to be about 1.8 mm outside of extended region 80. Since a USB socket has an opening for a 2.2-mm-thick plug, supporting underside ribs 54 provide the additional 0.4 mm of thickness to ensure a good fit in the USB socket.

Figure 10:
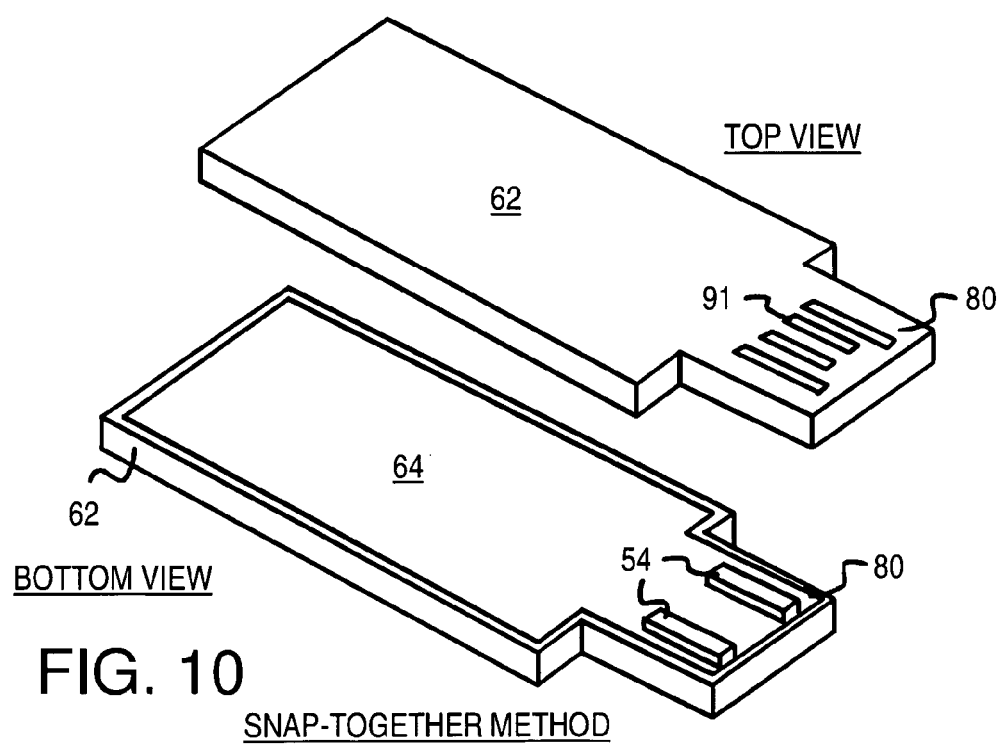
FIG. 10 shows a USB flash-memory card assembled using the snap-together method.

FIG. 10 shows a USB flash-memory card assembled using the snap-together method. Upper case 62 and lower case 64 are plastic cases that fit together and are locked together by the snap tabs of lower case 64 fitting onto the grooves in upper case 62, enclosing board 60 of FIGS. 8A–B. Metal contacts 42 on board 60 are exposed through openings 91 in upper case 62 between dividers and end rails. Supporting underside ribs 54 are formed in lower case 64, allowing the total thickness of the assembled flash-memory card to be about 2.0 mm outside of extended region 80. Since a USB socket has an opening for a 2.2-mm-thick plug, supporting underside ribs 54 provide the additional 0.2 mm of thickness to ensure a good fit in the USB socket. As can be seen from the bottom view, lower case 64 is smaller in area than upper case 62 and fits inside upper case 62.

Figure 11:
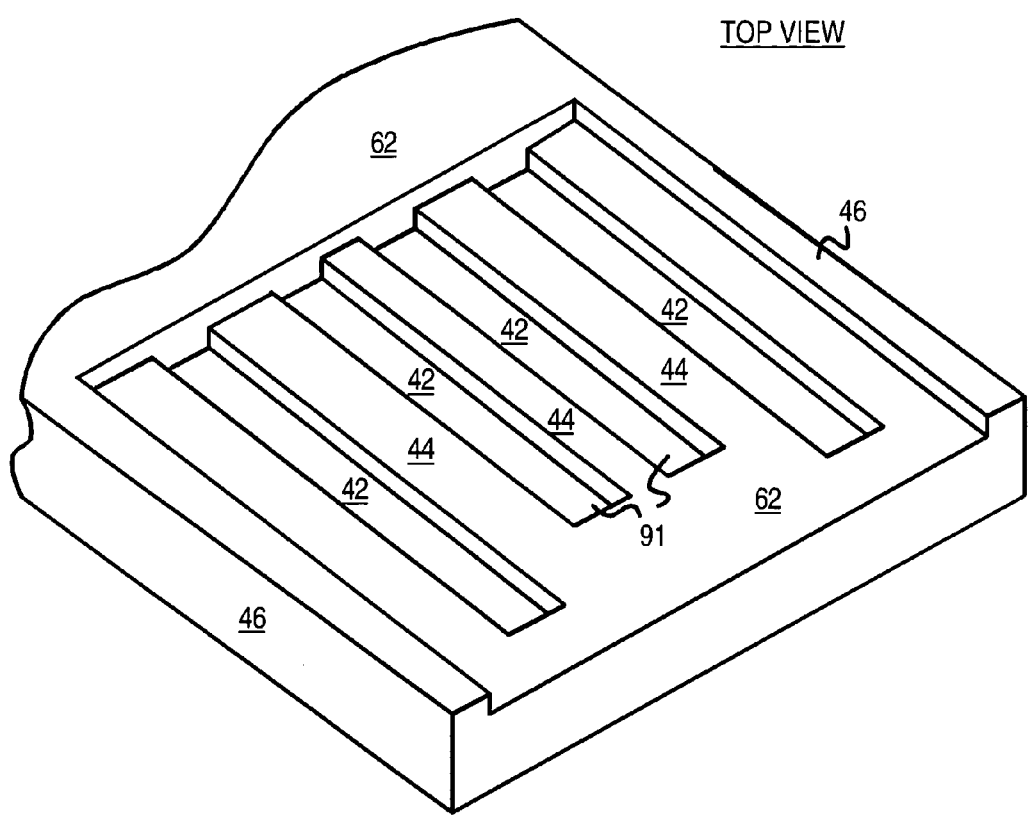
FIG. 11 shows a close up of the connector end of the flash-memory-drive card showing dividers and end rails.

FIG. 11 shows a close up of the connector end of the flash-memory-drive card showing dividers and end rails. Metal contacts 42 are flat metal contactors formed on a top surface of board 60. Board 60 is mostly enclosed by upper case 62 and lower case 64, but has four openings 91 over metal contacts 42 to allow metal contacts 42 to be visible from outside. Metal contacts in a USB socket can reach through openings 91 to make electrical contact with metal contacts 42.

Dividers 44 and end rails 46 are parts of upper case 62 that are formed between openings 91. Dividers 44 and end rails 46 can have a low height to allow metal contacts 42 to be reached the metal contacts on the female USB connector. End rails 46 may be taller than dividers 44 or may be the same height as the dividers. The top surface of upper case 62 may have a cutout over metal contacts 42 as shown, or may be co-planar.

Figure 12A:
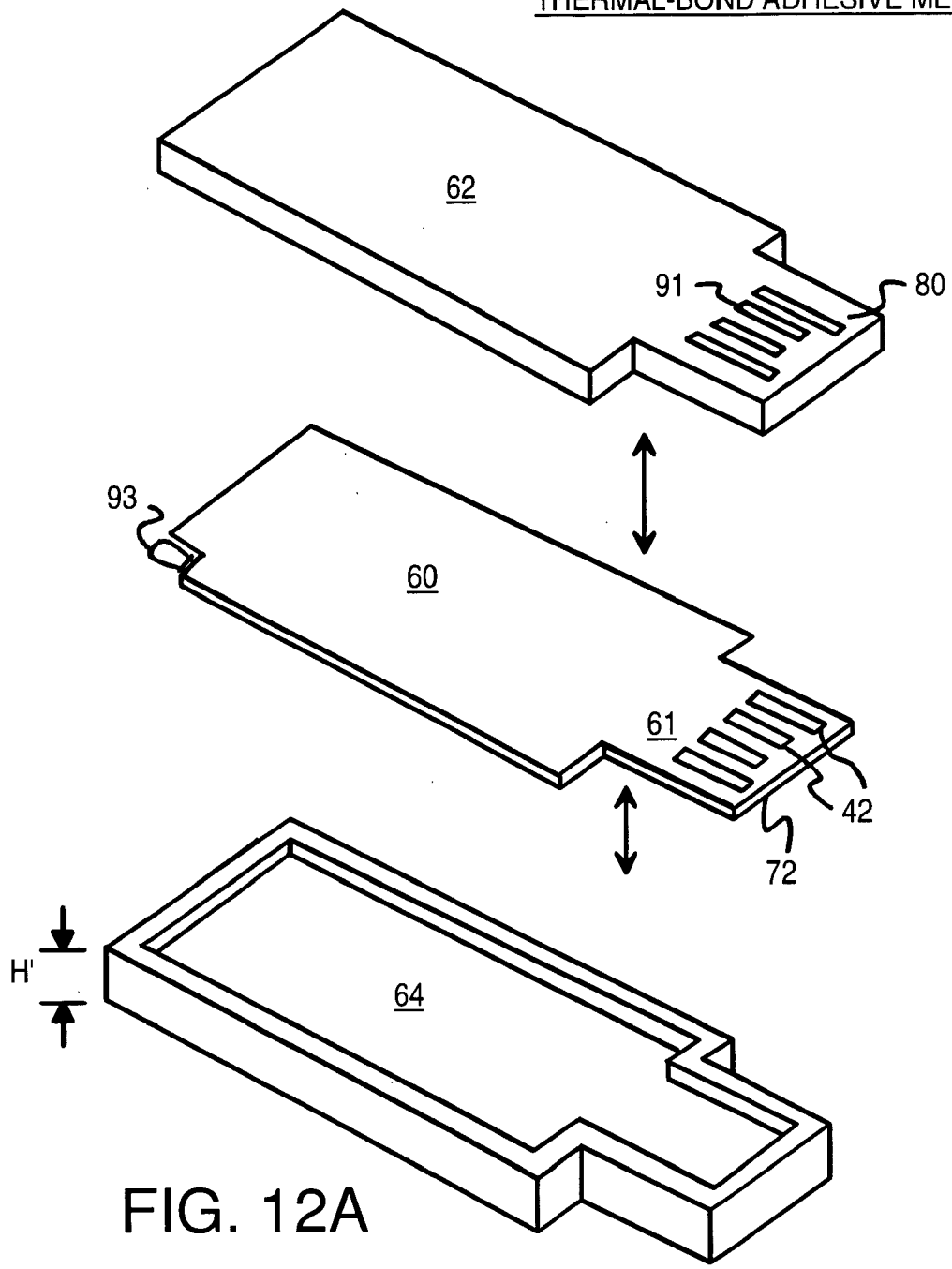

FIGS. 12A–B show assembly of a flash-memory-drive card with a reduced thickness using a thermal-bond adhesive process. The USB flash-memory card is assembled from upper case 62, board 60 and its mounted components, and lower case 64, which are sandwiched together to form the USB-drive. FIG. 12A shows a top view, where metal contacts 42 are visible, while FIG. 12B shows a bottom view where metal contacts 42 are hidden from view.

Rather than use raised ridges for ultrasonic bonding or snap tabs, adhesive can be used. Pressure or heat sensitive adhesive films can be attached to upper case 62 or to lower case 64 where bonding is desired. For example, an adhesive could be brushed on as a liquid or paste, or it could be a double-coated adhesive film such as 3M's 7953 film. A thermal bond film (TBF) such as 3M's TBF-668 could also be used.

Once upper case 62 and lower case 64 are pressed together with board 60 in between, the adhesive can be cured by heating the assembly, by pressing the cases together, or by allowing sufficient time for curing. Upper case 62 fits inside lower case 64 in this embodiment.

Supporting underside ribs 54 are not formed in extended region 80 on lower case 64 in this embodiment. Instead, lower case 64 has a larger thickness to meet the metal springs in the USB socket. For example, the total thickness H' of the assembled flash-memory card can be about 2.2 mm in extended region 80. Since a USB socket has an opening for a 2.2-mm-thick plug, a good fit in the USB socket is ensured.

This thickness H' of 2.2 mm is larger than the thickness H of 2.0 mm in FIG. 8B, since supporting underside ribs 54 are not present.

ALTERNATE EMBODIMENTS

Several other embodiments are contemplated by the inventors. For example a combination of the methods may be used, such as using adhesive for mounting the PCB but ultrasound or snaps for connecting the plastic covers together. For the snap-together method, instead of using simple protrusion snap tabs and grooves, a combination of matching male and female fingers can be substituted. Snap-tabs with movable latching teeth or extensions or locking portions may also be used. Different thicknesses and dimensions can be substituted for the examples given. In some embodiments upper case 62 could be smaller than lower case 64 and upper case 62 could fit within lower case 64, or vice-versa.

Rather than mount packaged IC's onto the bottom-side of board 60, unpackaged die may be mounted using die-bonding techniques. Using unpackaged die rather than packaged die may reduce the size and weight of the card.

The supporting underside ribs or bumps can be merged together into a larger rectangle or take on other shapes while still providing support. Three or more ribs could be used. When the supporting ribs are not used, the locking depressions of the parent patent could be used or could be omitted. Any of the processes could be used with or without supporting underside ribs 54.

A variety of materials may be used for the connector substrate, circuit boards, metal contacts, metal case, etc. Plastic cases can have a variety of shapes and may partially or fully cover different parts of the circuit board and connector, and can form part of the connector itself. Various features can have a variety of shapes and sizes. Oval, round, square, rectangular, trapezoidal, and other shapes may be used.

The slim connector may be considered "half-height", since it fits on one side of the female's connector substrate but not on the other side of the female's connector substrate. The actual "half-height" connector may not be exactly half the height of a standard connector, but is considered "half-height" because it engages only half of the female connector. The slim connector may be a reduction in height of only 30–40% rather than exactly half.

The slim connector may be widened to accommodate extra metal contacts to become an extended-USB connector for future USB specification. Moreover, the width of the slim connector can be widened, and the height and metal contacts of the slim connector can be varied, making it into a general-purpose slim connector, for USB, extended-USB, PCI Express, mini PCI Express applications, etc.

Other embodiments may use a stand-alone male slim USB connector rather than the integrated male slim USB connector. The end rails may be taller than the dividers or may be the same height as the dividers.

Other applications besides flash drives include USB connectors on desktop computers, notebook computers, PDA's, digital cameras, cellular phones or handsets, TV set-top boxes, MP3, MPEG4, copiers, printers, and other electronic devices. Such devices may use to advantage the slim-ness of the new male and/or female USB connectors, and may reduce size and space together with lower cost. A USB flash drive with the new slim male connector can still be directly inserted into a host PC with a legacy female USB connector.

There are 4 pins in the current USB pin out definition—VCC, GND, D+, and D−. VCC is the 5V power pin. GND is the ground pin and D+ and D-are the differential data I/O pins. For the USB 2.0 specification, data transfer rates are up to 480M bits/sec, and the power supply current is 500 mA. These might not meet future (or even some current) needs of speed and power associated with some USB devices, such as large flash memory cards.

Additional metal contacts can be added to the new connectors. These additional metal contacts can serve as power, ground, and/or I/O pins which are extensions to the USB specification, or as PCI Express (or mini PCI Express) specifications. Greater power capability can be obtained with (or without) additional power and ground pins (or by a higher power supply current of the existing power pin). Multiple power supplies can also be provided by the additional power and ground pins. The improved power supply capabilities allow more devices and/or more memory chips to be powered. Extra I/O pins can be added for higher bandwidth and data transfer speeds. The additional I/O pins can be used for multiple-bit data I/O communications, such as 2, 4, 8, 12, 16, 32, 64, . . . bits. By adopting some or all of these new features, performance of flash memory cards/devices can be significantly improved. These additional pins could be located behind or adjacent to the existing USB pins, or in various other arrangements. The additional pins could be applied to male and female connectors, both the current or the new slim connectors. New types of flash memory cards/devices can be made with these new connectors, which have the additional pins.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A portable, pluggable card with an integrated slim Universal-Serial-Bus (USB) connector comprising:
    a connector substrate;
    a plurality of metal contacts disposed on a first surface of the connector substrate, the metal contacts for carrying USB signals;
    one or more integrated circuits mounted to a second surface of the connector substrate, the second surface being a side of the connector substrate that is opposite the first surface;
    a lower case and an upper case for encapsulating the connector substrate when assembled;
    a plurality of openings in the upper case that correspond in number and location to the plurality of metal contacts, the plurality of openings in the upper case allowing the plurality of metal contacts to make physical contact with metal pads on a female USB socket when inserted; and
    a plurality of dividers formed between the plurality of openings in the upper case, each divider disposed between an adjacent pair of the metal contacts, the plurality of dividers rising above the first surface of the connector substrate when assembled;
    wherein the plurality of dividers are for filling in a gap between the connector substrate and a female socket substrate when the integrated slim USB connector is inserted into the female USB socket.

2. The portable, pluggable card of claim 1 wherein the upper case and the lower case are plastic cases;
    wherein the upper case is bonded to the lower case during assembly by ultra-sonic bonding, by inserting snap tabs into grooves, or by an adhesive.

3. The portable, pluggable card of claim 2 wherein the upper case contains ridges that first make contact with the lower case during assembly by ultra-sonic bonding, the ridges being absorbers of a ultra-sonic energy that are heated by the ultra-sonic energy, or
    wherein the lower case contains ridges that first make contact with the upper case during assembly by ultra-sonic bonding, the ridges being absorbers of the ultra-sonic energy that are heated by the ultra-sonic energy.

4. The portable, pluggable card of claim 2 wherein the upper case contains
    snap tabs that fit into groves in the lower case during assembly, or wherein the lower case contains snap tabs hat fit into groves in the upper case during assembly.

5. The portable, pluggable card of claim 4 further comprising:
    end rails on the upper case, substantially parallel to the metal contacts when assembled, formed along side edges of the upper case;
    wherein the end rails are for sliding in gaps between sides of the female connector substrate of the female USB socket and a metal case surrounding the female connector substrate when the integrated slim USB connector is inserted into the female USB socket.

6. The portable, pluggable card of claim 4 further comprising:
    a light window formed by a thinning of plastic in the upper case or in the lower case, the light window allowing some light from a light-emitting diode to pass through the upper or lower case;
    a light-emitting diode mounted to the connector substrate, for generating light for passing through the light window to indicate a status to a user.

7. The portable, pluggable card of claim 4 wherein the connector substrate is a printed-circuit board (PCB) containing wiring traces.

8. The portable, pluggable card of claim 4 further comprising:
    supporting underside ribs formed on the lower case in an insertion end underneath the connector substrate, the insertion end for inserting into the female USB socket, the supporting underside ribs increasing a thickness of the insertion end of the portable, pluggable card.

9. The portable, pluggable card of claim 8 wherein a non-insertion end of the portable, pluggable card is thinner than the insertion end.

10. The portable, pluggable card of claim 8 wherein the supporting underside ribs slide over metal springs on the female USB socket.

11. The portable, pluggable card of claim 4 wherein the one or more integrated circuits mounted to the second surface of the connector substrate comprises:

a flash memory chip.

12. The portable, pluggable card of claim 11 wherein the one or more integrated circuits mounted to the second surface of the connector substrate further comprises:

a controller chip mounted on the connector substrate, for reading data from and for writing data to the flash memory chip and sending the data over the metal contacts as USB signals to the female USB socket.

13. A Universal-Serial-Bus (USB) card assembly comprising:

a circuit board having wiring traces, the circuit board having four metal contacts on an insertion end of a contact side of the circuit board, the four metal contacts for connecting to USB contacts in a USB socket when inserted;

an upper case for substantially covering the contact side of the circuit board when assembled;

a lower case for substantially covering a reverse side opposite the contact side of the circuit board when assembled;

four openings in an insertion end of the upper case, the four openings allowing the four metal contacts to contact the USB contacts through the upper case when inserted into the USB socket; and three dividers in the upper case, each divider begin a portion of the upper case between two of the four openings, the dividers protruding upward from the contact side of the circuit board when assembled;

wherein the upper case is bonded to the lower case with the circuit board encased between the upper case and the lower case when assembled.

14. The USB card assembly of claim 13 further comprising:

ultrasonic protrusions on a first case that first initially contact a second case during assembly, the ultrasonic protrusions partially melting to bond the upper case to the lower case when ultrasonic energy is applied during assembly;

wherein the first case is the upper case and the second case is the lower case, or the first case is the lower case and the second case is the upper case.

15. The USB card assembly of claim 13 further comprising:

an adhesive applied to a first case before assembly to bond to a second case;

wherein the first case is the upper case and the second case is the lower case, or the first case is the lower case and the second case is the upper case.

16. The USB card assembly of claim 13 further comprising:

supporting underside ribs formed on an insertion end of the lower case, the supporting underside ribs situated in a direction parallel to the four metal contacts when assembled.

17. The USB card assembly of claim 16 further comprising:

wherein a height of the insertion end of the USB card assembly is less than a standard height of a standard USB male connector, whereby the USB card assembly has a reduced height.

18. The USB card assembly of claim 17 further comprising:

wherein the supporting underside ribs are located to engage metal springs on the USB socket, whereby the supporting underside ribs provide a secure fit into the USB socket when inserted.

19. The USB card assembly of claim 13 further comprising:

snap protrusions on a first case;

grooves on a second case;

the snap protrusions fitting into the grooves during assembly;

wherein the first case is the upper case and the second case is the lower case, or the first case is the lower case and the second case is the upper case.

20. The USB card assembly of claim 19 further comprising:

chips mounted to the reverse side of the circuit board, wherein the chips include a flash-memory chip and a controller chip.

21. A reduced-height Universal-Serial-Bus (USB) plug card comprising:

circuit board means for supporting integrated circuits on a bottom side, having an insertion end for insertion into a USB socket;

metal contactor means, formed on the insertion end of a top side of the circuit board means, for making electrical contact with a USB socket when the insertion end is inserted into the USB socket;

top body means, formed from plastic, for partially encapsulating the top side of the circuit board means;

bottom body means, formed from plastic, for encapsulating the bottom side of the circuit board means;

divider means, formed between openings in the top body means, for dividing gaps between the insertion end of the USB plug card and the USB socket when inserted, the openings being over the metal contactor means when assembled;

bottom support means, formed on the insertion end of the bottom body means, for sliding along metal springs on the USB socket during insertion; and end means, on the top body means, for extending side edges of the top body means to fill in gaps to sides of the USB socket produced by lack of a surrounding wrap surrounding the top body means;

whereby stability when inserted into the USB socket is increased by the divider means, the end means, and the bottom support means.

22. The reduced-height USB plug card of claim 21 wherein the top body means is bonded to the bottom body means to enclose the circuit board means, wherein a snap together bonding process bonds the top body means to the bottom body means.

23. The reduced-height USB plug card of claim 22 further comprising:

light window means, formed by a thinning of plastic in the top body means or in the bottom body means, for allowing some light from a light-emitting diode to pass through;

a light-emitting diode mounted to the circuit board means, for generating light for passing through the light window means to indicate a status to a user.

* * * * *